March 20, 1956 H. KREIDEL ET AL 2,738,994
CAM ACTUATED GLAND TYPE PIPE COUPLING
Filed June 21, 1951
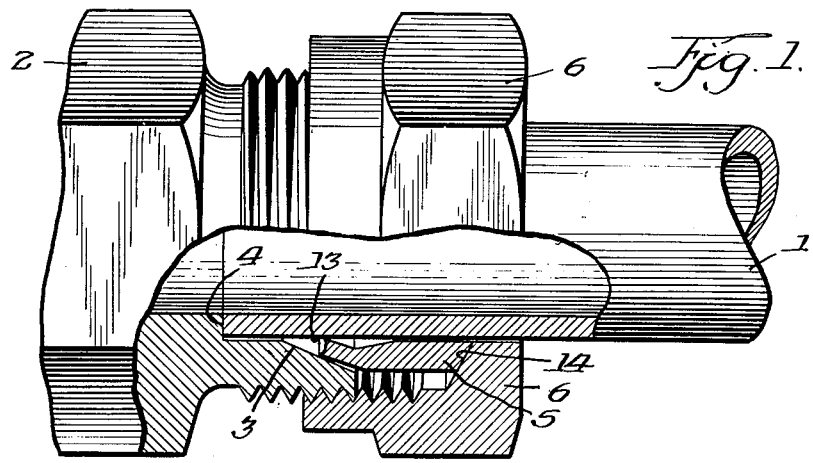
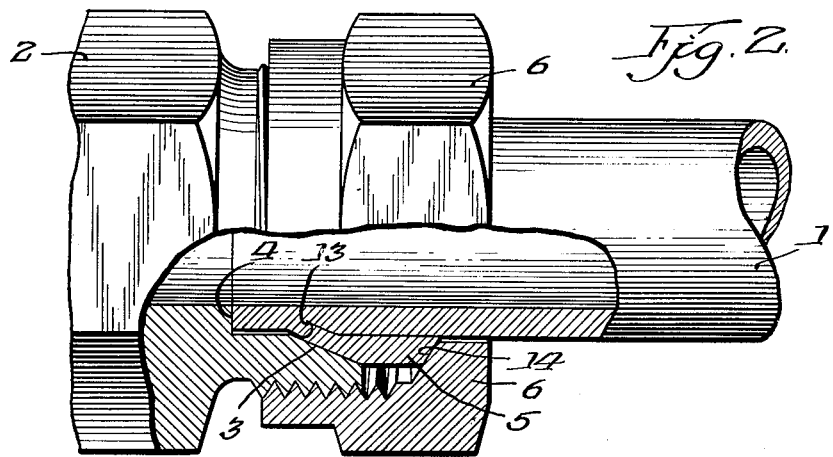
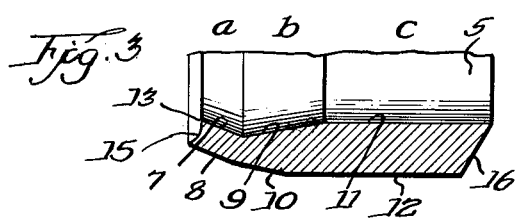 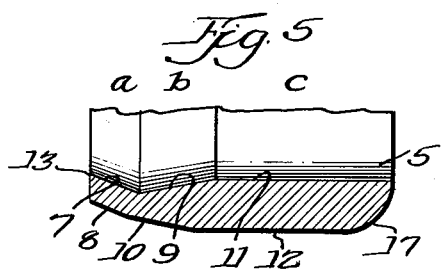
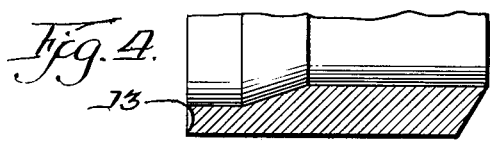 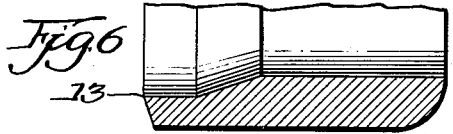
Inventors.
Hans Kreidel, &
Hans Kreidel, Jr.
By
Atty.

United States Patent Office 2,738,994
Patented Mar. 20, 1956

2,738,994

CAM ACTUATED GLAND TYPE PIPE COUPLING

Hans Kreidel and Hans Kreidel, Jr., Wiesbaden, Germany

Application June 21, 1951, Serial No. 232,694

Claims priority, application Germany June 28, 1950

3 Claims. (Cl. 285—122)

This invention is concerned with pipe couplings constituting an improvement on the couplings disposed in United States Patent No. 2,139,413, issued December 6, 1938.

Known pipe couplings of this type provide a tubular exteriorly threaded interiorly conical or outwardly flaring connecting member for receiving one end of a pipe. A packing or sealing sleeve is put on the pipe and tightened thereon by a nut which is screwed on the threaded connecting member, portions of the packing sleeve cutting or biting into the material of the pipe to provide a tight joint.

While these couplings are for many cases satisfactory, they exhibit certain shortcomings which the present invention proposes to remedy. The edge portions of the known packing sleeve, which bite into the pipe, are for many cases of use not sturdy and durable enough. The conical inside wall of the connecting member, against which the sleeve is pressed to produce radial inward deformation thereof so as to cause its edge to bite into the pipe, may be damaged, impairing the joint. If relatively thin-walled pipes are to be coupled, the radially inwardly effective pressure exerted by the packing sleeve may cause detrimental deformation of the pipes, may constrict them, with consequent impairment of the joint by insufficient pressure engagement of the cutting edge of the sleeve with the pipe. Loose couplings may thus result, which are not sufficiently fluidtight.

Fatigue of the materials may cause failure which has been observed with such couplings, particularly in cases of fuel oil or air lines which are subjected to constant or re-recurrent shocks or vibrations. Breakage occurs in such installations almost invariably at certain sections of the packing sleeve or associated parts.

Various expedients which have been proposed to overcome these and other drawbacks do not provide a solution for the problem, while requiring additional expenditures in the production of the couplings.

The present invention retains desirable features of the known pipe couplings, e. g., the feature of providing a packing sleeve which cuts or bits into the pipe to be joined, and provides a structure comprising component parts of particular shape, which may be easily produced for any case of use, resulting in a coupling for use in any conceivable circumstances and producing entirely satisfactory fluidtight and structurally safe and sturdy connections with all kinds of pipes, even with pipes having relatively thin walls.

This principal object is realized by the provision of a new tubular packing or sealing sleeve having three distinct parts or portions of differentiated angular configuration of its outer and inner surfaces which merge one into the other, forming, first, a frontal or inner leading part or portion which acts in the manner of a cutting tool for tight and firm sealing engagement with a pipe; second, an intermediate portion which fills the inside conical space of the tubular connecting member in clamping and sealing engagement therewith; and third, a rearwardly or axially outwardly extending portion which is engaged by the tightening nut and transmits to the sleeve the axially effective force required to make the fluid- and pressure-tight seal. The individual parts or portions of the new packing or sealing sleeve thus have their independent but cooperating functions which result in a most favorable application and utilization of the forces employed so that, by the use of relatively small forces, a wholly satisfactory and unobjectionable seal is produced, which meets the highest requirements.

The frontal or inner leading portion of the packing sleeve, which is formed to operate in the manner of a cutting tool and constitutes the frontal or inner sealing portion thereof, may be formed with parallel inner and outer surfaces which taper in accordance with the angle of the conical inner wall surface of the tubular connecting member. The intermediate portion, which fills the space of the conical interior of the tubular connecting member in clamping and sealing engagement therewith, extends from the frontal portion at an angle which corresponds to the angle formed between the outer surface of the pipe and the conical inner surface of the tubular connecting member. The rearwardly extending portion of the packing sleeve, which transmits the axially effective force exerted by the tightening nut, extends with its inner and preferably with its outer surface in parallel with the pipe to be joined.

The leading edge of the frontal or inner portion of the packing sleeve is displaced radially inwardly as well as axially responsive to displacement of the sleeve by the operation of the tightening nut, and bites into the pipe. The depth of penetration into the pipe material is a function of the wall thickness of the frontal or leading portion of the sleeve and of the length of the tubular section of such frontal portion relative to the conical surface of the inner wall of the tubular connecting member. The depth of penetration or biting into the pipe may thus be predetermined in advance and may be fitted to the wall thickness of the pipe that is to be joined. Thin-walled pipes may therefore be connected in fluid- and pressure-tight manner without any danger of radial deformation or constriction thereof.

The axial forces acting upon the sleeve during the tightening operation cause a displacement of the intermediate portion thereof. The angle formed between the inner and outer surfaces of such intermediate portion corresponds to that between the outer surface of the pipe and the conical inner surface of the tubular connecting member. Upon completion of the tightening operation, the outer surface of the intermediate sleeve portion will therefore lie in engagement with the conical inner wall of the connecting member, and the surface of its inner wall will engage the surface of the pipe. This intermediate portion of the packing sleeve is thus clamped securely and intimately throughout its length, between the inner conical wall of the connecting member and the outer wall of the pipe. Hollow spaces are entirely avoided. The fluidtight connection and the safeguard against separation of the parts are thus formed at the frontal cutting tool-like leading edge of the packing sleeve, while its intermediate portion is clamped throughout a corresponding long section between the pipe and the connecting member. An angular displacement of the pipe within the coupling is impossible, and the transverse rigidity is thus considerably improved.

The rear portion of the packing sleeve functions substantially for taking and transmitting the axially effective tightening forces exerted thereon by the nut. The tightening nut is for the transmission of these forces onto the rearwardly extending portion of the sleeve provided with an angularly transversely extending inner pressure surface which may be at an angle greater than 90° preferably in excess of 100°. The rear end of the sleeve is also tapered, either by rounding it or by the provision of an angular surface thereon which may correspond to the angle of the coacting transversely extending angular surface formed in the tightening nut.

The configuration of the parts as indicated above produces, during the initial axial displacement of the sleeve, a relatively loose coaction with the pipe, substantially without causing any braking forces. Near the completion of the cutting and tightening operation, the growing resistance against the axially inwardly effective tightening force applied by the nut will bring the rear end of the sleeve into pressure engagement with the pipe. In case a gasket is used, the configuration of the parts will reduce the friction between the gasket and the tightening nut to a minimum and will prevent rotation of the gasket with the nut.

The rounding of the rear end of the packing sleeve, which faces the transverse inner wall of the tightening nut, results, in connection with the use of flange-tightening members, in the further advantage that a nonuniform tightening which is in such structures usually unavoidable cannot detrimentally affect the uniform axial advance of the packing sleeve.

The structure of the packing sleeve and its cooperation with the other parts of the coupling result in an extraordinarily good tightening and in a safe clamping and holding of the pipe end to be joined, and bring additional advantages.

The taper of the frontal portion of the packing sleeve, which corresponds to the conical taper of the inside of the tubular connecting member, brings about an axially effective drawing displacement of the sleeve, avoiding unnecessary waste in the application of force, thereby facilitating the cutting of the leading sleeve edge or end into the pipe, the cutting edge being harder than the pipe material. The cutting edge is in the completed joint securely positioned in place, because the wall thickness of the frontal portion of the sleeve is uniform and because the wall thickness can be predetermined so as to avoid any detrimental effect on the cutting edge.

The invention proposes, in accordance with another object, to form the inner or leading frontal end of the packing sleeve with an annular concave groove, thus producing a hollow-ground cutting edge. This edge acts upon the material of the pipe like a machine cutting tool, producing in coaction therewith an effective tightening.

The firm gripping of the pipe by the sleeve along its hollow-ground cutting edge and the clamping of the sleeve between the pipe and the tubular connecting member, without leaving any hollow spaces, produces a coupling of highest transverse sturdiness which is resistant to displacement. Shocks, concussions, vibrations, bending stresses or the like cannot affect the security of the coupling and its fluid- and pressure-tight connections.

The structure also eliminates the necessity for means for limiting the axial advance of the sleeve during the tightening operation, because the secure and intimate mutual clamping of the parts determines the completion of the operation by making any further advance of the sleeve impossible.

The structure also makes assembly of the coupling with the tubular sleeve member inadvertently disposed in reversed position practically impossible. The coacting parts of the coupling are in their configuration approximated for mutual coaction. The relatively thick rear end of the sleeve cannot enter the interiorly conical tubular connecting member at all. While the packing sleeve is not long enough to entirely exclude threading of the tightening nut onto the connecting member, with the sleeve in reversed position, a cutting of the cutting edge of the sleeve into the pipe is impossible. The cutting edge will merely clamp fast in engagement with the transverse inner wall of the tightening nut and will be deformed.

The tubular connecting member does not have to absorb the strong forces which are required in known couplings, and it is therefore possible to reduce its wall thickness, thereby reducing the over-all size of the entire structure.

The axial sliding action of the packing sleeve, during the tightening operation, is improved by smooth outer and inner surfaces, and it is for this reason desirable to make the sleeve of drawn tubing. The inner surface of the sleeve may be machined in accordance with the angular configurations thereof, and the configuration of the outer surface is then produced by suitable forming, thereby giving the inner surface its final angular position.

The objects and features indicated in the foregoing and additional objects and features will appear more clearly from the detailed description which is rendered below with reference to the accompanying drawings. In these drawings, Fig. 1 shows in diagrammatic representation an example of the new coupling partly in elevation and partly in sectional view, with the parts positioned at the beginning of the sealing operation;

Fig. 2 illustrates the coupling in similar representation, with the parts shown at the completion of the sealing operation;

Figs. 3 and 4 are somewhat enlarged partial sectional views of an embodiment of a packing sleeve such as used in Figs. 1 and 2, with the various portions thereof in finished condition and in preformed shape, respectively; and Figs. 5 and 6 show partial sectional views of a modified packing sleeve in finished and in pre-formed condition in a manner analogous to the views indicated in Figs. 3 and 4.

Referring now to the drawings, numeral 1 designates the pipe that is to be connected; 2 is the tubular connecting member which is interiorly conical or provided with an outwardly flaring mouth, as indicated at 3; and 4 is the end of the pipe 1 seated in the recess in the connecting member 2 from which extends the outwardly flaring mouth 3. The tubular packing or sealing sleeve is shown in Figs. 1 and 2 at 5 and the tightening nut at 6.

The packing sleeve, as is more clearly apparent from Figs. 3 and 5, comprises in each case three mutually merging parts or portions a, b, c. The frontal or leading sealing portion a, acting in the manner of a cutting tool, has an inner surface 7 and an outer surface 8 disposed in parallel and at an angle to the axis which corresponds to the inclination of the conical inner wall 3 of the connecting member 2. The tapering intermediate portion b embraces with its inner surface 9 and its outer surface 10 an angle which corresponds to the angle formed by the outer surface of the pipe 1 with the inner conical wall 3 of the connecting member 2. Extending rearwardly from the intermediate portion b is the rear or base portion c which serves to take and to transmit the axial pressure force exerted thereon by the nut 6 during the tightening thereof. The inner and outer walls of this portion c extend in parallel and parallel with the outer surface of the pipe 1. Expressing the angular relationship of the three portions of the sleeve in other words, the angle at which the leading portion a lies with respect to the longitudinal plane of the pipe surface equals the angle formed by the tapering walls or surfaces of the intermediate portion b and the latter angle equals the angle formed by the conical inner wall 3 of the connecting member 2 with the longitudinal plane of the pipe surface. The rear wall 14 of the portion c of the sleeve extends at an angle to the pipe surface which is preferably greater than 100°. The sleeve is, at least at its frontal portion which forms the cutting tool-like edge 13, harder than the material of the pipe 1.

In assembling the coupling, the nut 6 is put on the pipe or tubing 1, and the packing sleeve 5 is slipped on it. The pipe end is then seated in engagement with the seat 4 formed by the recess in the tubular connecting member 2, and the nut 6 is screwed on the connecting member. The axial advance of the nut moves the packing sleeve axially inwardly in the direction of the connecting member 2. The sleeve initially slides with the outer surface 8 (Figs. 3 and 5) of its frontal leading portion *a* along the surface of the inner conical wall 3 (Figs. 1 and 2) of the connecting member 2, and incident to its further axial advance cuts with its cutting edge 13 into the pipe until the point of transition of the inner wall of the frontal portion *a* and the inner wall of the intermediate portion *b* lies in intimate engagement with the pipe 1. The intermediate portion *b* of the sleeve is, due to its angular configuration, at the same time pressed into the space between the outer pipe wall and the inner conical wall 3 of the connecting member, filling this space completely and being intimately and securely clamped therein in sealing position as indicated in Fig. 2.

The rear portion *c* of the sleeve member is near the completion of the tightening operation also pressed radially inwardly against the pipe 1, due to the increasing axial pressure exerted thereon by the nut 6. This is due to the transversely angularly directed wall 14 of the nut 6 forming an angle measured with respect to the longitudinal axis which is greater than 90° and, as shown in the drawings, forming an angle of approximately 120°. The resulting distribution of axially directed pressure upon the coacting rearwardly facing surface of the sleeve portion *c* is, due to this configuration, such that there is no undesired braking effect along the outer pipe wall, during the advance of the sleeve, and that the corresponding sleeve portion is pressed radially inwardly against and in engagement with the pipe wall only at the conclusion of the operation. Rotation of the sleeve with the nut, during the tightening, is likewise prevented.

The outer pipe wall is in the completed coupling strongly and safely embraced by the packing sleeve throughout its length and is rigidly held thereby relative to the conical inner wall 3 of the connector 2 and relative to all other parts of the structure, thus producing a perfect and strong coupling which is pressure- and fluidtight and resistance to vibrations and shocks.

The packing sleeve is produced in a manner as will now be explained with reference to Figs. 3/4 and 5/6, respectively, showing two embodiments thereof.

The initial material for the sleeve is preferably a length of a drawn tubing so as to take advantage of the relatively smooth outer wall thereof. The corresponding lengths of tubings are machined to produce the inner surfaces, as shown in Figs. 4 and 6, respectively, these surfaces being angularly related one to the other in accordance with the sectional requirements and angles of the portions *a*, *b*, *c*. The resulting respective preshaped sleeves are then shaped by means of a suitable device (not shown), preferably by pressure forming, to produce the final shapes as shown in Figs. 3 and 5, respectively. As seen from these figures, the frontal or leading sealing portions *a* of the corresponding sleeves now have an inwardly conical shape in accordance with the inner conical wall 3 of the connecting member 2 illustrated in Figs. 1 and 2.

In the embodiment Fig. 5, the cutting edge 13 extends in a straight plane perpendicular to the outer wall of the pipe 1. In the embodiment Fig. 3, the cutting edge 13 is hollow-ground at 15, as is also shown in the assembled couplings of Figs. 1 and 2.

The rearwardly facing transverse surface 16 of the rear portion *c* of the packing sleeve, as shown in Fig. 3, is disposed at an angle corresponding to the angle of the transverse inner surface 14 of the tightening nut 6 which may be in excess of 100°, as shown. The coaction between these two surfaces provides, as already mentioned, for a favorable axial pressure application and pressure transmission, and avoids rotation of the sleeve with the nut. The frictional forces between these surfaces are by their configuration and cooperation held at a minimum.

In the embodiment Fig. 5, the rearwardly facing end of the sleeve is rounded as shown at 17. This form is particularly advantageous in case the member taking the place of the tightening nut is a flange-connecting member, because the tightening pressure forces will then become fully effective to bring about the axial advance of the packing sleeve. They will not be dissipated between the flange and the sleeve.

Changes may be made within the scope and spirit of the accompanying claims.

We claim:

1. A coupling comprising a tubular connecting member having a main bore and an outwardly flaring mouth at one end; a tubular clamping member having an internal annular shoulder and threadedly secured to said connecting member at said end and providing an annular space between the end and the shoulder; and a tubular packing sleeve received in said space and adapted to extend into said mouth, said sleeve including a main body section having an outer end face, an inner section having parallel inner and outer walls and an inner end face provided with an internal annular biting edge for penetration of a wall of an element adapted to be embraced thereby, and an intermediate section joining said main body section and said inner section of said sleeve, with the smallest diameter of the inner end face, the inner diameter of the main body section and the inner diameter of said shoulder being substantially equal and greater than the diameter of the main bore of said connecting member, said intermediate section having inner and outer walls convergent in the direction of the inner end face at an angle substantially equal to the angle of flare of the mouth, the inner walls of the intermediate and inner sections intersecting in a circle of greater diameter than the inner diameter of the main body section, and the outer end face of said main body section abutting the shoulder of said clamping member.

2. The coupling as defined in claim 1 wherein the inner end face is defined by an annular concavity.

3. The coupling as defined in claim 1 wherein a tubular member is embraced by said packing sleeve and clamped thereby between said connecting member and clamping member.

References Cited in the file of this patent

UNITED STATES PATENTS

| | | |
|---|---|---|
| 2,139,413 | Kreidel | Dec. 6, 1938 |
| 2,179,127 | Lauer | Nov. 7, 1939 |
| 2,230,116 | Kreidel | Jan. 28, 1941 |
| 2,343,922 | Parker | Mar. 14, 1944 |
| 2,414,184 | Wurzburger | Jan. 14, 1947 |
| 2,450,314 | Vandervoort | Sept. 28, 1948 |
| 2,472,872 | Woodling | Jan. 14, 1949 |
| 2,553,619 | Woodling | May 22, 1951 |

FOREIGN PATENTS

| | | |
|---|---|---|
| 110,622 | Australia | May 14, 1940 |
| 431,083 | Great Britain | July 1, 1935 |
| 433,656 | Great Britain | Aug. 19, 1935 |
| 588,902 | Great Britain | June 5, 1947 |